April 9, 1935. W. JUFFA Re. 19,525

CONTAINER FOR THE PACKING OF ARTICLES

Original Filed Feb. 21, 1931

INVENTOR
WILHELM JUFFA
BY
Richards & Geier
ATTORNEYS

Reissued Apr. 9, 1935

Re. 19,525

UNITED STATES PATENT OFFICE 19,525

CONTAINER FOR THE PACKING OF ARTICLES

Wilhelm Juffa, Ilmenau, Germany, assignor to Kimble Glass Company, Vineland, N. J., a corporation of Illinois Original No. 1,895,249, dated January 24, 1933, Serial No. 517,471, February 21, 1931. Application for reissue May 10, 1934, Serial No. 725,006. In Germany February 24, 1930

14 Claims. (Cl. 206—65)

This invention relates to a container for the packing of cylindrical articles of fragile material provided with a foot, especially of measuring, mixing and hydrometer cylinders of glass, porcelain and the like.

Such articles were hitherto packed in wood wool. The layer of wood wool between the individual articles had to be sufficiently thick, to prevent breakage of the articles under all conditions. Apart from the troublesome and time-wasting work involved and from the dirty and, owing to the dust developed, unhygienic manner of working, the employment of wood wool required a considerable amount of waste space so that only a relatively small number of articles could be accommodated in a container. Moreover, the danger of breakage was not absolutely prevented as it was impossible to make the layers of wood wool of absolutely uniform thickness at all points. The result was a certain amount of play for the articles in some places and losses through breakage caused by vibrations during transport.

These disadvantages are overcome according to the invention in a very simple and reliable manner.

The invention relates to a method of and a container for packing cylindrical articles of fragile material provided with a foot, especially measuring, mixing and hydrometer cylinders of glass, porcelain and the like.

The invention is characterized in that the articles are inserted in two layers in a container provided with partitions and adapted to be opened on both sides in inserting first half the glasses as first layer, missing every second compartment, after which the feet of the glasses in the first layer are covered on both sides with a perforated insert, the holes of which leave the nonfilled rows free. The glasses are then inserted as second layer in the compartments which have been left free, so that the feet of the two layers are separated by the inserts.

According to one method of packing according to the invention, half the glasses are inserted in two layers only from one side, the first layer being first inserted, one row and in each row to be filled one compartment being left free, whereupon, after the feet of the inserted glasses have been covered with a perforated insert, the second layer is inserted, in that in the rows left free the compartments are also filled and left free alternately and the glasses of the other half are then also inserted in two layers from the other side.

Another method of packing consists in that first half the glasses are inserted from the two sides alternately as first layer, missing one row alternately, and after the feet of this first layer have been covered with the inserts on both sides the remaining glasses are inserted in a similar manner alternately from the two sides as second layer.

The container for carrying out the method according to the invention is characterized in that, in a container provided with partitions and designed to be opened at both sides, perforated inserts are arranged on both sides for covering the first layer of glasses inserted into the compartments, which inserts leave free alternately one row and in the rows alternately one compartment and separate the feet of the first layer from those of the second layer.

Inside the outer walls of the container, that is between same and the compartments proper, a narrow space is provided for increasing the protection against external mechanical influences, said space corresponding to the width of the cylinder feet projecting beyond the outer row of compartments.

In the case of cylinders with an exceptionally wide foot, as chiefly occurs with very large cylinders, that is when the diameter of the foot is larger than twice the width of the compartment, the feet of cylinders arranged in one layer would, in the case of compartments provided only a single partition, come into contact or overlap laterally. In order to prevent this, special rows are provided between the individual rows of compartments for cylinders with relatively very wide feet, the width of these special rows corresponding to the actual size of the feet.

An embodiment of the invention is illustrated by way of example in the accompanying drawing, in which.

Figure 1:
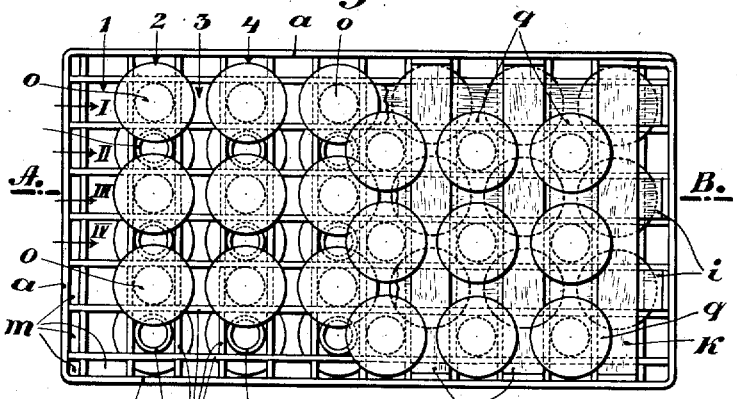
Fig. 1 shows in front elevation a container according to the invention partly filled with cylinders and partly fitted with an insert made of strips.
Figure 2:
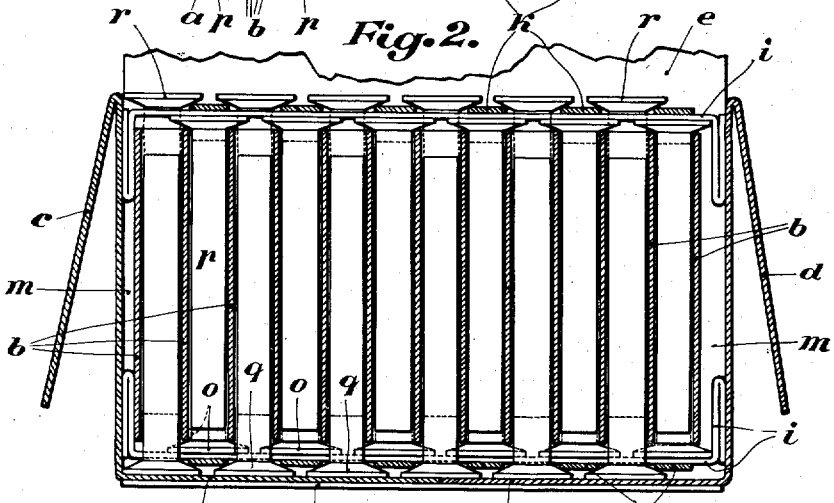
Fig. 2 is a longitudinal section on line A—B of Fig. 1.
Figure 3:
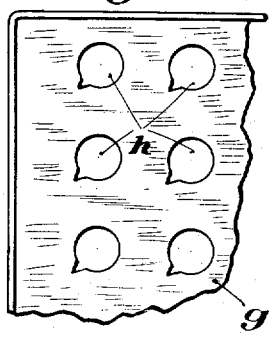
Fig. 3 shows a one-piece insert.
Figure 4:
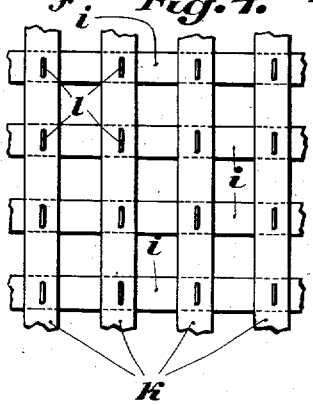
Fig. 4 shows an insert composed of strips.
Figure 5:
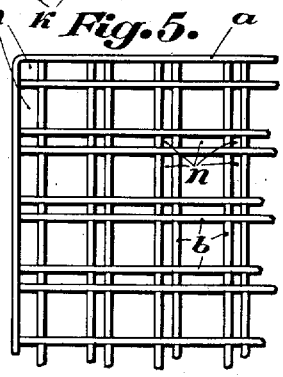
Fig. 5 is a front elevation of a container with internal protecting spaces.

The container *a* is provided with internal partitions *b* and adapted to be closed on each side with lids *c*, *d* and *e*, *f* respectively. The one-piece insert *g* has holes *h* (Fig. 3) which may be provided with a laterally extending slot at one point. According to a second form of construction, illustrated in Fig. 4, the insert is composed of longitudinal strips *i* and transverse strips *k*, which are connected at the points of intersection by clips *l*. The container *a* is provided with external protecting spaces *m*. The container according to Figure 5 has further internal protecting spaces *n*.

The filling of the container with cylinders is effected in the following manner. The cylinders *o* are first inserted into the compartments 2, 4, 6 etc. of the rows I, III, V. The cylinders *p* are then inserted from the opposite side into the compartments 1, 3, 5 etc., of the same rows I, III, V. An insert *g* or an insert composed of the strips *i* and *k* is then placed on the feet of the cylinders *o* introduced from the first side. The compartments 1, 3, 5 etc. of the rows II, IV, VI are then filled with cylinders and, after the feet of the cylinders first inserted have been covered with an insert, the remaining holes 2, 4, 6 etc. of the rows II, IV, VI etc. are filled with cylinders from the other side. A number of rows in the vertical and horizontal direction is preferably selected, divisible by 2, because in this instance the inserts can be similarly perforated and the necessary relative displacement of the holes on the two sides is obtained by simply reversing the inserts, whereas if the number is not divisible by 2, the inserts must be different, that is provided with displaced holes.

What I claim as my invention is:

1. The means for packing articles having a cylindrical stem and a laterally projecting foot portion, said means comprising a container, partitions forming rows of compartments within said container, lids for two sides of said container, every second compartment of every second row receiving a series of articles with their foot portions projecting beyond said partitions on one side of said container, intermediate compartments of the same rows receiving a second series of articles with their foot portions projecting beyond said partitions on the opposite side of said container, an insert having openings at least equal to the diameter of the stems of the articles, said insert being situated between the foot portions of the first-mentioned series of articles and the foot portions of a third series of articles situated in every second compartment of intermediate rows, the third-mentioned series of articles projecting through the openings of said insert and having foot portions situated on the first-mentioned side of said container, and a second insert having openings at least equal to the diameter of the stems of the articles and situated between the foot portions of the second-mentioned series of articles and the foot portions of a fourth series of articles situated in intermediate compartments of intermediate rows, the last mentioned series of articles projecting through the openings of the second-mentioned insert and having foot portions situated on the second-mentioned side of said container.

2. The means for packing articles having a cylindrical stem and a laterally projecting foot portion, said means comprising a container, partitions forming rows of compartments within said container, lids for two sides of said container, every second compartment of every second row receiving a series of articles with their foot portions projecting beyond said partitions on one side of said container, intermediate compartments of the same rows receiving a second series of articles with their foot portions projecting beyond said partitions on the opposite side of said container, an insert having openings at least equal to the diameter of the stems of the articles, said insert being situated between the foot portions of the first-mentioned series of articles and the foot portions of a third series of articles in every second compartment of intermediate rows, the third-mentioned series of articles projecting through the openings of said insert and having foot portions situated on the first-mentioned side of said container, and a second insert having openings at least equal to the diameter of the stems of the articles and situated between the foot portions of the second-mentioned series of articles and the foot portions of a fourth series of articles situated in intermediate compartments of intermediate rows, the last mentioned series of articles projecting through the openings of the second-mentioned insert and having foot portions situated on the second-mentioned side of said container, said inserts comprising longitudinal strips, transverse strips, and means for connecting said longitudinal strips with said transverse strips.

3. In a construction for packing articles having a stem and a laterally projecting flange at one end thereof, means providing a plurality of openings for receiving the stems of a plurality of said articles with the flanged ends thereof projecting beyond said means at one side thereof and with certain of said flanges disposed on the same side of said means overlapping each other, and means for preventing contact of the overlapping flanges of said articles.

4. In a construction for packing articles having a stem and a laterally projecting flange at one end thereof, means providing a plurality of openings for receiving the stems of a plurality of said articles with the flanged ends thereof disposed on the same side of said means in overlapping relation with respect to each other, and a member associated with said means through which the stems of certain of said articles extend for maintaining the overlapping flanges of said articles out of contact with each other.

5. In a construction for packing articles having a stem and a laterally projecting flange at one end thereof, means providing a plurality of openings for receiving the stems of a plurality of said articles with the flanged ends thereof projecting beyond said means at one side thereof, and means associated with said first mentioned means for maintaining the flanges of adjacent articles at the said one side of the means in different planes and out of contact with each other.

6. In a construction for packing articles having a stem and a laterally projecting flange at one end thereof, means providing a plurality of openings for receiving the stems of a plurality of said articles with the flanged ends thereof projecting beyond said means at one side thereof, and a spacing member having openings through which the stems of certain of said articles extend for maintaining the flanges of adjacent articles disposed on the same side of said means in different planes.

7. In a construction for packing articles having a stem and a laterally projecting flange at one end thereof, partitions forming compartments for receiving the stems of a plurality of said articles with the flanged ends thereof projecting beyond said partitions at one side thereof, and means for maintaining the flanges of adjacent articles projecting beyond the same side of the partitions in different planes and out of contact with each other.

8. In a construction for packing articles having a stem and a laterally projecting flange at one end thereof, partitions forming compartments for receiving the stems of said articles with the flanged ends thereof projecting beyond said compartments at one side thereof, and a member associated with said partitions adjacent the ends of the compartments formed thereby having openings registering with certain of said compartments through which the stems of certain of said articles extend, whereby the flanges of certain of said articles are maintained out of the plane of the remainder of said articles on the same side of the compartments.

9. In a construction for packing articles having a stem and a laterally projecting flange at one end thereof, means providing a series of openings for receiving the stems of said articles and a second means having openings registering with certain of the openings in said first mentioned means, said second mentioned means constituting a spacer disposed between the flanges of a series of articles having their stems disposed in certain of the openings in said first mentioned means and their flanges disposed on the same side of said first mentioned means as said second mentioned means and a second series of articles having their stems disposed in the openings of said first and second mentioned means and their flanges disposed on the side of said second mentioned means remote from said first mentioned means.

10. In a construction for packing articles having a stem and a laterally projecting flange at one end thereof, partitions forming compartments for receiving the stems of a plurality of said articles, and a member having openings registering with certain of said compartments, said member constituting a spacer disposed between the flanges of a series of articles having their stems disposed in certain of said compartments and their flanges between the ends of said compartments and said member and a second series of articles having their stems disposed in the openings of said member and in the remainder of said compartments and their flanges disposed on the side of said member remote from the ends of said compartments.

11. In a construction for packing articles having a stem and a laterally projecting flange at one end thereof, partitions forming a plurality of closely spaced compartments open at their opposite ends, certain of said compartments receiving the stems of a series of said articles with their flanges projecting beyond said compartments at one end thereof and the remainder of said compartments receiving a series of articles with their flanges projecting beyond said compartments at the other end thereof, and means associated with the ends of said compartments for maintaining the flanges of adjacent articles in different planes and out of contact with each other.

12. In a construction for packing articles having a stem and a laterally projecting flange at one end thereof, a container, partitions within said container forming compartments opening through one side of said container, and an insert in said container having openings registering with certain of said compartments, said insert constituting a spacer disposed between the flanges of a series of articles having their stems disposed in certain of said compartments and their flanges disposed between the ends of said compartments and said insert and a second series of articles having their stems extending through said insert and disposed in other of said compartments and having their flanges disposed on the side of said insert remote from the ends of said compartments.

13. In a construction for packing articles having a stem and a laterally projecting flange at one end thereof, means providing rows of openings, every second opening of every second row receiving the stems of a series of articles with their flanges disposed beyond said means, and a member having openings adapted to receive the stems of a second series of articles, said member being located between the flanges of the first mentioned series of articles and the flanges of a second series of articles located in every second opening of intermediate rows of said first mentioned means and having their flanges disposed on the same side of said means as the flanges of the first mentioned series of articles.

14. In a means for packing articles having a stem and a laterally projecting flange at one end thereof, partitions providing a plurality of rows of compartments adapted to receive the stems of said articles with the flanges of said articles projecting beyond said compartments at one side thereof, and a member having openings registering with certain of said compartments and having portions overlying the flanges of certain of the articles located in said compartments, said member being disposed between the flanges which it overlies and the flanges of other articles located in certain of said compartments, the flanges of the last mentioned other articles being disposed on the same side of the compartments as the flanges which the said member overlies.

WILHELM JUFFA.